United States Patent [19]

Challis

[11] Patent Number: 5,033,904
[45] Date of Patent: Jul. 23, 1991

[54] TUBULAR DOWEL SYSTEM

[75] Inventor: Brian Challis, Sandy, Utah

[73] Assignee: Challis Stairways, Inc., Sandy, Utah

[21] Appl. No.: 473,058

[22] Filed: Jan. 31, 1990

[51] Int. Cl.$^5$ ................................................. F16B 7/00
[52] U.S. Cl. ...................................... 403/292; 403/298;
403/265; 403/332; 285/289
[58] Field of Search ............... 403/298, 292, 268, 265,
403/267, 266, 332; 285/289, 297; 411/82, 258

[56] References Cited

U.S. PATENT DOCUMENTS

| | | | |
|---|---|---|---|
| 425,071 | 4/1890 | Greene | 403/293 X |
| 1,344,221 | 6/1920 | Burns | 285/297 X |
| 2,868,602 | 1/1959 | Drezner | 403/298 |
| 3,405,592 | 10/1968 | Blodee | 403/292 X |
| 3,810,341 | 5/1974 | Holz | 403/292 X |
| 4,637,193 | 1/1987 | Lange | 403/381 X |

Primary Examiner—Andrew V. Kundrat
Attorney, Agent, or Firm—Thorpe, North & Western

[57] ABSTRACT

A dowel system for securing in a generally abutting relationship two parts or pieces of material having facing surfaces and preformed, aligned annular recesses. The dowel system includes a tubular body having sidewalls which are thinner near the middle of the body than at the ends thereof. The tubular body is dimensioned so that opposite ends thereof may be inserted into respective annular recesses of the two pieces of material, with enough room being left around the sides of the tubular body to allow adhesive to be put in place in the annular recesses to join the tubular body to the sidewalls of the annular recesses.

34 Claims, 2 Drawing Sheets

TUBULAR DOWEL SYSTEM

BACKGROUND OF THE INVENTION

This invention relates to a dowel formed in the shape of a tube for insertion into annular recesses formed in pieces of material to be joined together by the dowel. The tubular dowel may also be combined with other attachment elements such as screws, bolts, nuts, brackets, etc., to also join two pieces of material together in an abutting relationship.

Cylindrical-shaped dowels have long been used to form so-called dowel joints in which two pieces of material are joined together in an abutting relationship. The dowel joint consists of aligned bores formed in the two pieces of material for receiving respective ends of the dowel, together with an adhesive, so that the two pieces may be firmly held together.

The above-described cylindrical dowel system has proven fairly effective in constructing furniture and other articles not likely to be subjected to rough use or excessive stress. Such dowel system has also been used in constructing and holding together stairwell systems which, as expected, are subjected to greater stresses. In these latter uses, the dowel system may be more likely to separate either by reason of the breaking or fracture of the dowel, breaking or fracture of one or both pieces of material joined together because of the weakening of the material as a result of forming the bores therein, or the pulling of the dowels from the bores. This latest event could occur, for example, because of insufficient surface areas between the dowel and the bore walls covered by adhesive.

A number of proposals have been made to increase such surface areas or otherwise improve the holding ability of the dowel joint. In E. D. Tyler, U.S. Pat. No. 77,337, a tubular metal "dowel pin" is disclosed for insertion in rings or annular recesses formed in two pieces of material to be joined together, the object being to increase the strength of the joint by preservation of material which would otherwise be drilled out to form bores rather than annular recesses. However, in order to join the two pieces of material together in proper alignment, the annular recesses must be precisely aligned, and this is difficult to achieve. In U.S. Pat. No. 3,756,635, issued to Howard L. Beers, a three piece dowel apparatus is disclosed for better distributing adhesive over the surfaces of the apparatus to join two pieces of material together. Of course, three pieces of material are now required where before a single dowel was utilized and thus obviously would increase the expense of the dowel joint.

SUMMARY OF THE INVENTION

It is an object of the invention to provide a simple, one piece dowel system with a substantially increased surface holding area.

It is another object of the invention to provide a tubular dowel system formed and shaped to more securely seat in a receiving annular recess with adhesive.

It is a further object of the invention to provide such a tubular dowel system formed and shaped to better spread and distribute liquid adhesive on the walls of receiving annular recesses and on the surface areas of the dowel system itself.

It is also an object of the invention to provide a tubular dowel system structure which may be readily manufactured or constructed.

It is an additional object of the invention to provide a tubular dowel system which does not require precise alignment of receiving annular recesses.

The above and other objects of the invention are realized in a specific illustrative embodiment of a dowel for securing in a generally abutting relationship two parts having facing surfaces and preformed, generally aligned annular recesses. The dowel includes a tubular body having sidewalls which are thinner near the middle of the body than at the end, the tubular body being dimensioned so that opposite ends thereof may be inserted into respective annular recesses of the two parts.

In accordance with another aspect of the invention, the width of the tubular body is formed to be greater at the opposite ends than at the middle to provide a wedge-shaped cross section for better gripping or holding capability when placed in an annular recess.

In accordance with still another aspect of the invention, the inner and outer surfaces of the sidewalls of the tubular body are formed with a plurality of alternating ridges and grooves which extend annularly about the axis of the tubular member, to provide resistance to axial movement of the tubular body in the annular recesses.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
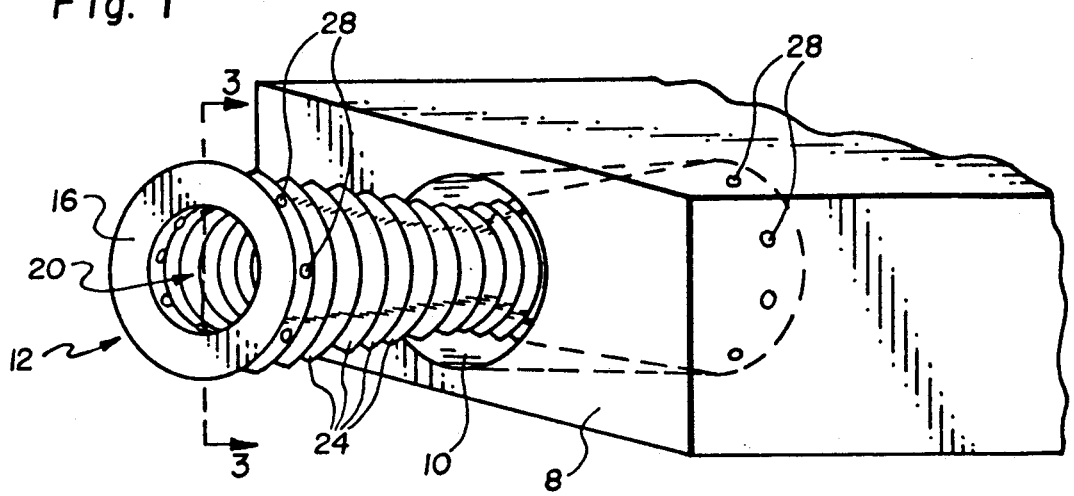
FIG. 1 is a perspective view of one embodiment of a tubular dowel made in accordance with the principles of the present invention.
Figure 2:
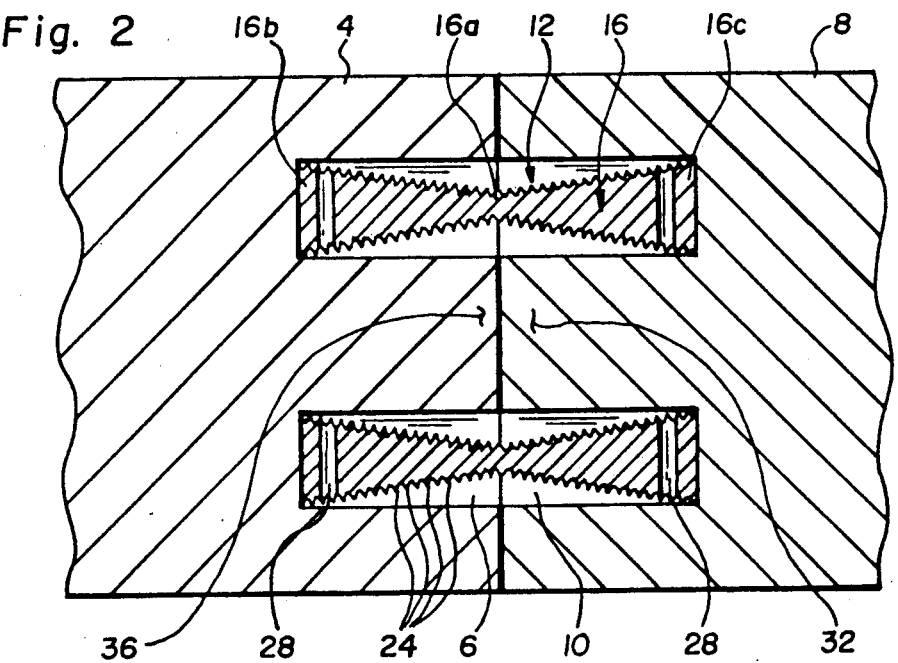
FIG. 2 is a side, cross-sectional view of the tubular dowel of FIG. 1 shown disposed in two pieces of abutting materials.
Figure 3:
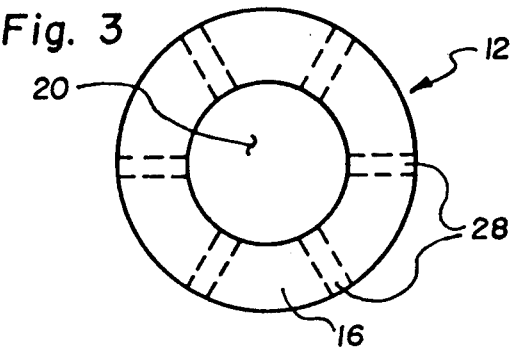
FIG. 3 is a top, cross-sectional view of the tubular dowel of FIG. 1 taken along lines 3—3.

Referring to FIGS. 1-3, there is shown one illustrative embodiment of a dowel for securing two pieces of material 4 and 8 (FIG. 2) together in an abutting relationship. The dowel is comprised of a tubular member 12 having sidewalls 16 and a central bore 20 (FIG. 1). The side, cross-section of the walls 16 is narrower at the middle 16a than at either end 16b and 16c (FIG. 2). In particular, the side, cross-section of the wall 16 is wedge shaped, tapering from enlarged ends 16b and 16c down to a narrower middle 16a.

The inside and outside surfaces of the sidewall 16 of the tubular member 12 are formed with alternating grooves and ridges 24 formed to extend annularly about the cylindrical axis of the tubular member. The alternating grooves and ridges 24 could either extend in rings circumferentially on the sidewall surfaces or helically. These ridges and grooves 24 serve to increase the surface area of contact with adhesive to facilitate better adherance to the walls of the annular recesses 6 and 10 into which the dowel would be placed (see FIG. 2). Also, the ridges and grooves 24 present a more resistant(against sliding from adhesive) surface area for the tubular member 12 to prevent the tubular member from being pulled out of the annular recesses.

Openings or apertures 28 are formed to extend through the sidewalls 16 of the tubular member 12 in circumferentially spaced apart positions near each end of the tubular member, as shown. Such apertures or openings could also be provided at other locations in the sidewall 16 but the locations shown are preferred. The openings 28 are provided to serve as pathways through which liquid adhesive can flow to disperse more uniformly about the tubular member 12. For example, the tubular member 12 could advantageously be installed in the annular recesses 6 and 10 of the pieces of material 4 and 8 by first placing it in the annular recess 10 as shown in FIG. 1. Adhesive could then be applied into the bore 20 of the tubular member 12 in which case it would initially rest on a the central pillar 32 (FIG. 2) about which the annular recess 10 is formed, with some of the adhesive flowing into the annular recess. The piece of material 4 would then be positioned over the end 16b of the tubular dowel 12 to be received into the annular recess 6, and then pushed toward the other piece of material 8 so that pillar 36 about which the annular recess 6 is formed pushes against the adhesive previously placed in the bore 20 to cause the adhesive to move into both recesses 6 and 10, through openings 28 to the outside of the tubular member. In this manner, the adhesive flows more uniformly over the inside and outside surface areas of the tubular member to provide better gripping and holding of the tubular member to the pieces of material 4 and 8 and thus better holding of the two pieces of material in the abutting relationship shown in FIG. 2.

Figure 5:
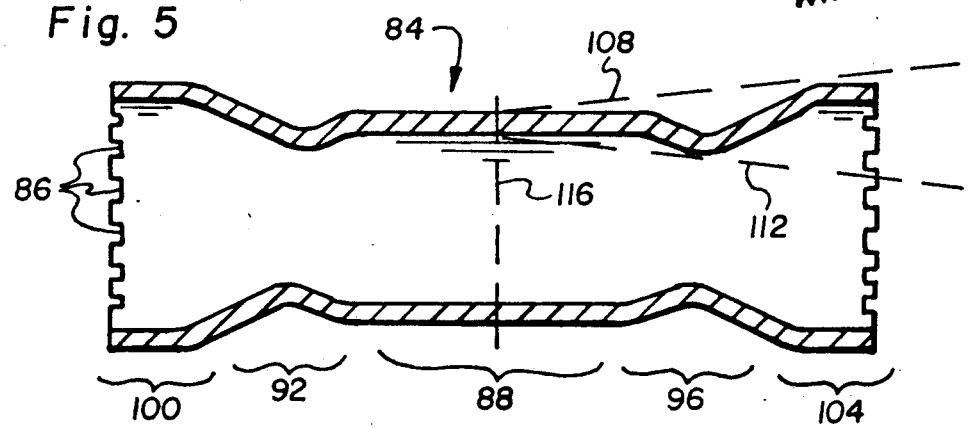
FIG. 5 is a side, cross-sectional view of an additional embodiment of a tubular dowel system made in accordance with the present invention.

Creneles, such as creneles 86 of the tubular dowel shown in FIG. 5, could be provided in place of or in addition to the openings 28 in the FIGS. 1-3 embodiment (and other embodiments) for distributing adhesive.

The wedge shaped cross-sections of the sidewalls 16 allows for some lateral play in movement of the tubular member 12 in the annular recesses to thereby accommodate some misalignment between the two pieces of material 4 and 8 for joining the two together. Also, the wedge shape leaves more free space in the annular recesses 6 and 8 for holding adhesive but yet not so much as to result in significant waste of adhesive. Finally, the wedge shape serves to better secure the two pieces of material 4 and 8 together by functioning in the same manner a wedge would function to resist pulling the tubular member 12 from either of the annular recesses 6 and 10. That is, the wedge shaped portions wedge themselves in place between the side wall of the recesses and the adhesive positioned between such side walls and the walls of the tubular member 12. Any failure of the tubular member 12 tends to be more gradual in slipping out of the annular recess and so safety considerations are enhanced.

Although both sides of the sidewall 16 of the tubular member 12 are shown sloping inwardly from each end toward the middle, other configurations could also be utilized. For example, the outside sidewall surface of the tubular member 12 could be substantially cylindrical (with no inward sloping of the surface), while the inside sidewall surface still sloped, or vice versa. Both configurations serve to hold two pieces of material together in a secure fashion.

Advantageously, the tubular dowel 12 is made of a metal or metal alloy material, fiberglass, various hard plastics, etc.

Figure 4:
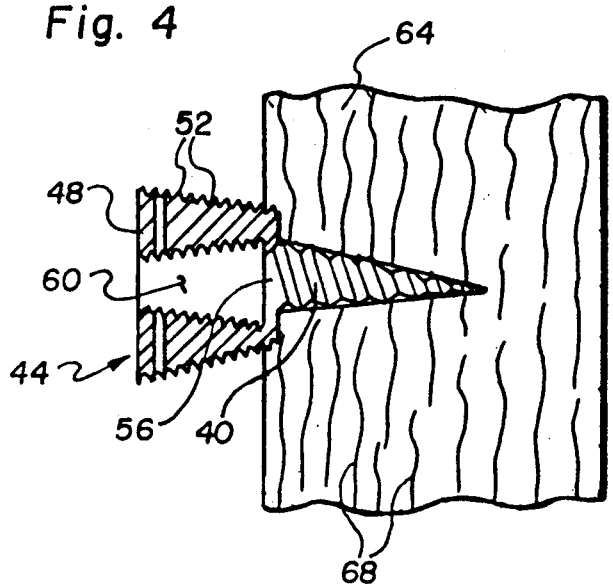
FIG. 4 is a side, cross-sectional view of another embodiment of the dowel system of the present invention which utilizes a tubular dowel portion in combination with a tapered screw.

FIG. 4 shows another embodiment of a dowel system made in accordance with the present invention. In this arrangement, one-half of the tubular member 12 of FIGS. 1-3 is used in conjunction with a threaded shank 40 formed in the shape of a tapered screw. The tubular portion 44 includes tapered sidewalls 48, the inside and outside surfaces of which are formed with alternating ridges and grooves 52, just as with the FIGS. 1-3 embodiment.

A plate section 56 is disposed on the narrow end of the tubular member 44 to bridge over the bore 60 of the tubular member and to serve as a mounting plate for the threaded shank 40. In the embodiment of FIG. 4, the threaded shank 40 is generally aligned with the central bore 60 of the tubular member 44. The threaded shank 40 is provided for fastening to one of the two pieces of material which are to be joined together but to be fastened in a conventional wood screw fashion by simply rotating and screwing the shank into a piece of material 64. The tubular member portion 44 is simply inserted in an annular recess of the other piece of material to be joined to piece 64, as described for the FIGS. 1-3 embodiment.

The arrangement of FIG. 4 is especially suitable for joining one piece of material whose long grains are to be perpendicular to the cross grain of another piece of material, such as material 64. The threaded shank 40 would readily screw into the piece of material 64 in a direction at right angles to the grain 68 to thereby provide a secure attachment. The other piece of material (not shown) would then be drilled with an annular recess to receive the tubular member 44, with the grains of the other piece of material running perpendicular to the grains 68.

Figure 4A:
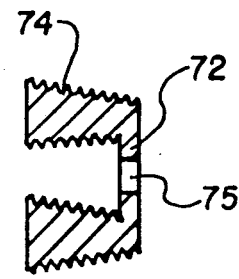
FIGS. 4A, 4B, and 4C are fragmented, side, cross-sectional views of still other embodiments of the present invention which utilize a tubular dowel portion in combination with another fastening elements.

The dowel system of FIG. 4 could be made of a single piece of material preferably metal or metal alloy, or the tubular member 44 and mounting plate 56 could be made of a sturdy plastic, with a wood screw inserted into the bore 60 and through an opening in the plate 56 to secure the tubular member onto the surface of the piece of material 64. This latter arrangement is shown in FIG. 4A where a plate 72 is disposed at the narrow end of a tubular dowel portion 74 and includes an opening 75 for receiving wood screws.

Figure 4B:
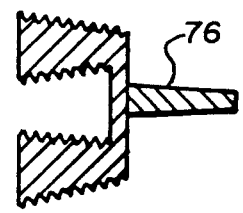
Figure 4C:
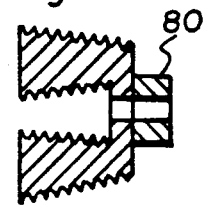

FIGS. 4B and 4C show respectively the use of a tubular dowel similar to tubular member 44 of FIG. 4, in conjunction with a bolt 76, and a nut 80. The bolt 76 and nut 80 are simply alternative fastening elements for use with a tubular dowel and would require fastening these elements to an appropriately positioned threaded bore or nut for receiving bolt 76, and a threaded shank for receiving nut 80.

FIG. 5 shows still another embodiment dowel system made in accordance with the present invention. This system comprises a piece of tubing 84, made preferably of a metal or metal alloy such as aluminum or steel, which has the capability of being preformed and shaped. The tubing 84 includes a central section 88 which has substantially the same diameter, two off center sections 92 and 96 whose diameters are pinched or less than that of section 88, and two end sections 100 and 104 whose diameters are greater than the central section 88. The sidewall of the tubing 84 has a generally uniform thickness as shown in FIG. 5, but could have variable thickness if so desired by the user. Also, although the "pinched" and "flared" sections 96 and 104 respectively are shown as being provided around the entire circumference of the tubing 84, provision of these sections on only one side, for example, might be desired.

An examination of the side, cross-section of the sidewalls of the tubing 84 reveal that if two straight lines 108 and 112 are drawn from a center line 116 of the tubing 84 towards one end of the tubing so that the lines just touch the outermost curve of the sidewall on the side occupied by the corresponding line, that the lines form a wedge shape similar to the side, cross-section of the tubular member 12 of FIGS. 1-3. The effect of this shaping of the sidewall of the tubing 84 of FIG. 5 is that even though the tubing sidewall does not have a wedge shape, the curvature provides the same function as though the wedge shape were present to achieve the advantages discussed earlier.

Figure 6:
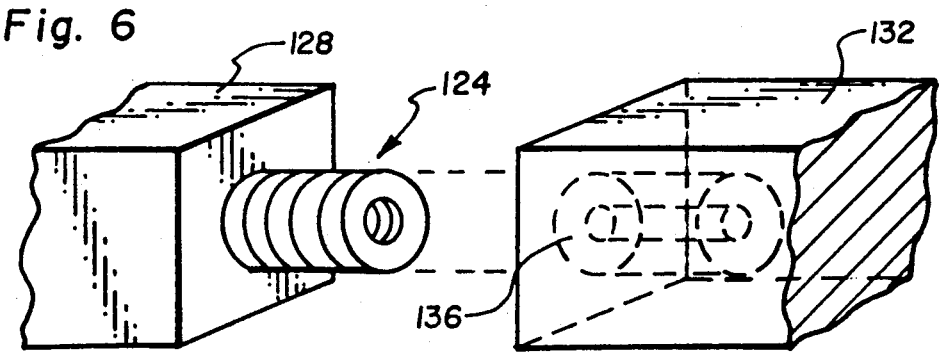
FIG. 6 is a perspective view of a further embodiment of a tubular dowel system made in accordance with the present invention.

FIG. 6 shows an embodiment of the invention in which a tubular dowel 124 is formed integrally with a piece of material 128 which is to be joined to another piece of material 132. The piece of material 132 is provided with an annular recess 136 (shown in dotted line outline) for receiving the tubular dowel 124 as discussed for the other embodiments.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A dowel for securing in a generally abutting relationship two parts having facing surfaces and preformed aligned annular recesses, said dowel comprising a tubular body having sidewalls which are thinner near the middle of the body than at the ends, said tubular body being dimensioned so that opposite ends thereof may be inserted into respective annular recesses of the two parts.

2. A dowel as defined in claim 1 wherein the exterior diameter of the tubular body is greater at the ends than at the middle.

3. A dowel as defined in claim 1 wherein the interior diameter of the tubular body is greater at the ends than at the middle.

4. A dowel as defined in claim 1 wherein the side cross-section of the sidewalls of the tubular body tapers inwardly from each end of the body toward the middle.

5. A dowel as defined in claim 1 wherein at least the inner or outer surface of the sidewalls of the tubular body are formed with a plurality of generally circumferentially disposed ridges and grooves.

6. A dowel as defined in claim 1 wherein at least the inner or outer surface of the sidewalls of the tubular body are formed with a plurality of generally helically disposed ridges and grooves.

7. A dowel as defined in claim 1 wherein the sidewalls of the tubular body include a plurality of apertures extending through the sidewalls to allow the flow of adhesive therethrough.

8. A dowel as defined in claim 7 wherein said apertures are located near each end of the body.

9. A dowel as defined in claim 8 wherein said apertures extend generally in a radial direction through the sidewalls.

10. A dowel as in claim 1 wherein the ends of the sidewalls are formed with a plurality of creneles.

11. A dowel as defined in claim 1 wherein said tubular body is composed of fiber-reinforced plastic composite.

12. A dowel as defined in claim 1 wherein said tubular body is composed of metal or metal alloy.

13. A dowel as defined in claim 1 wherein said tubular body is composed of structural ceramic.

14. A dowel for holding two pieces of material in abutting relationship, said pieces of material having generally axially aligned annular recesses, said dowel including a tubular member for insertion into the annular recesses to join the two pieces together, said tubular member having sidewalls whose inner and/or outer surfaces include generally circumferentially or helically extending grooves.

15. A dowel as in claim 14 wherein said grooves are formed over the inner and outer surface areas of the sidewalls of the tubular member, at least near each end thereof.

16. A dowel as in claim 14 wherein the tubular member is wider at its ends than at its middle.

17. A dowel as in claim 16 wherein the sidewalls of the tubular member are thinner near the midpoint of the tubular member than at its ends.

18. A dowel as in claim 17 wherein the side cross-section of the sidewalls of the tubular member gradually widens toward each end thereof.

19. A dowel as in claim 14 further including openings formed in the sidewall or at the ends of the tubular member.

20. A dowel for securing together in a generally abutting relationship two pieces of material, one of which has a preformed annular recess, said dowel comprising
   a tubular member dimensioned for insertion, one end first, into the annular recess,
   a mounting plate located at the other end of the tubular member, and
   means disposed on the mounting plate for affixing in the other piece of material, to thereby enable joining the two pieces of material together.

21. A dowel as in claim 20 wherein said tubular member has sidewalls which are thicker at said one end than at said other end.

22. A dowel as in claim 20 wherein the inner and outer surfaces of the sidewalls of the tubular member are formed with grooves which extend annularly about the axis of the tubular member.

23. A dowel as in claim 20 wherein said affixing means comprises a screw tapered generally to a point in the direction away from said one end for screwing into the other piece of material.

24. A dowel as in claim 20 wherein said affixing means comprises an opening in the mounting plate for receiving the threaded shank of a screw, and dimensioned to prevent the head of the screw from passing through the opening.

25. A dowel as in claim 20 wherein said affixing means comprises a bolt directed away from said one end for screwing into a threaded receptacle disposed in the other piece of material.

26. A dowel as in claim 20 wherein said affixing means comprises a nut screwable onto a bolt projecting from the other piece of material.

27. A dowel as in claim 20 wherein said mounting plate is formed to bridge over the opening in the tubular member at said other end thereof transversely of the axis of the tubular member, and wherein said affixing means is mounted on the mounting plate to project therefrom away from said one end.

28. A dowel as in claim 20 wherein said tubular member, mounting plate and affixing means are integrally constructed.

29. A dowel for holding two pieces of material together in abutting relationship, said pieces of material having generally axially aligned annular recesses, said dowel including an elongate tubular member for insertion into the annular recesses, said member having a diameter which has a first dimension at a middle section thereof, (b) second and third dimensions, which are less than said first dimension, at second and third sections spaced from the middle section toward first and second ends of the tubular member respectively, and (c) fourth and fifth dimensions, which are greater than said first dimension, at fourth and fifth sections spaced from the second and third sections toward the first and second ends respectively.

30. A dowel as in claim 29 wherein said tubular element includes a sidewall of generally uniform thickness.

31. A dowel as in claim 29 wherein said tubular element is comprised of plastic.

32. A dowel as in claim 29 wherein said tubular element is comprised of a metal or metal alloy.

33. A dowel as in claim 29 wherein said tubular element is comprised of aluminum.

34. A dowel system for joining one piece of material to another which has an annular recess formed therein, said system comprising a tubular member integrally formed with the one piece of material to project outwardly therefrom for insertion into the annular recess, said tubular member being formed with sidewalls which are thinner near the one piece of material than at the end of the tubular member fartherest away from the one piece of material.

* * * * *